US009031762B1

(12) United States Patent
Bell et al.

(10) Patent No.: US 9,031,762 B1
(45) Date of Patent: May 12, 2015

(54) SYSTEM AND METHOD FOR DYNAMICALLY ADAPTING TO EVENTS DURING OPERATIONS OF A VEHICLE (71) Applicant: Sprint Communications Company L.P., Overland Park, KS (US)

(72) Inventors: Timothy Robert Bell, Lee's Summit, MO (US); Jonathan M. Bollinger, Lenexa, KS (US); Tae-Woo Cha, Overland Park, KS (US); Janet Kay Price, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 218 days.

(21) Appl. No.: 13/675,946

(22) Filed: Nov. 13, 2012

(51) Int. Cl.
G06F 19/00 (2011.01)
G06F 17/00 (2006.01)

(52) U.S. Cl.
CPC .................................. G06F 17/00 (2013.01)

(58) Field of Classification Search
USPC .............. 725/133; 718/102; 715/808; 705/9; 370/468; 358/1.15; 345/173
See application file for complete search history.

(56) References Cited

U.S. PATENT DOCUMENTS

| 5,406,490 | A | 4/1995 | Braegas |
| 6,282,475 | B1 | 8/2001 | Washington |
| 6,622,087 | B2 | 9/2003 | Anderson |
| 6,711,474 | B1 | 3/2004 | Treyz et al. |
| 8,068,952 | B2 | 11/2011 | Valentine et al. |
| 8,233,919 | B2 | 7/2012 | Haag et al. |
| 8,744,769 | B1 | 6/2014 | Bell et al. |
| 2001/0029425 | A1 | 10/2001 | Myr |
| 2002/0082771 | A1 | 6/2002 | Anderson |
| 2006/0230428 | A1* | 10/2006 | Craig et al. ..................... 725/133 |
| 2006/0293040 | A1 | 12/2006 | Kortge |
| 2007/0019237 | A1* | 1/2007 | Nobutani ..................... 358/1.15 |
| 2007/0211757 | A1* | 9/2007 | Oyman ......................... 370/468 |
| 2008/0086355 | A1* | 4/2008 | Bradley et al. ..................... 705/9 |
| 2009/0133025 | A1* | 5/2009 | Malhotra et al. .............. 718/102 |
| 2009/0271107 | A1 | 10/2009 | Smith |
| 2009/0327508 | A1 | 12/2009 | McCarthy et al. |
| 2009/0328116 | A1 | 12/2009 | McCarthy et al. |
| 2010/0285787 | A1 | 11/2010 | Matsuda |
| 2011/0004401 | A1 | 1/2011 | Rothschild |
| 2011/0035139 | A1 | 2/2011 | Konlditslotis et al. |
| 2011/0213787 | A1 | 9/2011 | Cerny |
| 2011/0301839 | A1 | 12/2011 | Pudar et al. |
| 2012/0065872 | A1 | 3/2012 | Nortrup |
| 2012/0197484 | A1 | 8/2012 | Nath et al. |

(Continued)

OTHER PUBLICATIONS

Bell, Timothy Robert, et al., Patent Application entitled "System and Methods for Head Unit Providing Analysis and Guidance During Long Road Trips," filed Jan. 24, 2013, U.S. Appl. No. 13/749,676.

(Continued)

Primary Examiner — James Trammell
Assistant Examiner — Sanjeev Malhotra (57) ABSTRACT Embodiments relate generally to devices and methods for tracking events of a vehicle and associating those events with the driver and/or passengers within the vehicle at the time the events occurred. This may be accomplished by associating an individual identifier of a mobile device with a driver and/or passenger and connecting the mobile device to the head unit of the vehicle, wherein the head unit of the vehicle then associates the individual identifier of the mobile device with the tracked events.

15 Claims, 7 Drawing Sheets

(56) References Cited

U.S. PATENT DOCUMENTS

| | | |
|---|---|---|
| 2012/0282908 A1 | 11/2012 | Nicolini |
| 2013/0054134 A1 | 2/2013 | Wang et al. |
| 2013/0073201 A1 | 3/2013 | Coughlin et al. |
| 2013/0086518 A1* | 4/2013 | Park et al. .................. 715/808 |
| 2013/0106750 A1* | 5/2013 | Kurosawa ................... 345/173 |
| 2013/0116882 A1 | 5/2013 | Link, II et al. |
| 2013/0151088 A1 | 6/2013 | Ricci |
| 2013/0157647 A1 | 6/2013 | Kolodziej |
| 2013/0281021 A1 | 10/2013 | Palin et al. |
| 2013/0289859 A1 | 10/2013 | Kim |
| 2013/0317862 A1 | 11/2013 | Fernandes et al. |
| 2013/0346124 A1 | 12/2013 | Stern et al. |

OTHER PUBLICATIONS

First Action Interview Pre-Interview Communication dated Dec. 6, 2013, U.S. Appl. No. 13/749,676, filed Jan. 24, 2013.

Notice of Allowance dated Jan. 23, 2014, U.S. Appl. No. 13/749,676, filed Jan. 24, 2013.

* cited by examiner

SYSTEM AND METHOD FOR DYNAMICALLY ADAPTING TO EVENTS DURING OPERATIONS OF A VEHICLE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Motor vehicles may now provide wireless communications based functionality. In an embodiment, a head unit may be installed in a motor vehicle that provides a variety of functionality that depends at least partly on wireless communications connectivity via a cellular network. For example, the head unit of a vehicle may be operable to connect (wirelessly and/or via a cable or wire connection) with one or more mobile device within the vehicle, allowing for information transfer between the head unit and mobile device(s).

Additionally, some motor vehicles may be equipped with a monitoring system, which may utilize sensors within the vehicle to obtain information about the use of the vehicle. A monitoring system may be operable to track or receive events that occur within the vehicle, and possibly analyze the tracked events.

SUMMARY

In an embodiment, a method for calculating multi-user vehicle usage is disclosed. The method comprises connecting a first mobile device comprising an individual identifier with a head unit in a vehicle; tracking events from the vehicle; associating the tracked events with the individual identifier of the first mobile device; generating a report of the tracked events associated with the first mobile device; associating the individual identifier of the first mobile device with a first user of the vehicle; and connecting a second mobile device comprising an individual identifier with the head unit in the vehicle, wherein the second mobile device is connected either consecutively or concurrent with the first mobile device.

In an embodiment, a method for calculating cost allocation for multiple users of a vehicle is disclosed. The method comprises connecting a plurality of mobile devices with a head unit in a vehicle, each of the mobile devices comprising an individual identifier; receiving events from the vehicle; associating the received events with the individual identifiers of the mobile devices, wherein the events associated with the individual identifier occur while the mobile device is connected to the head unit; associating the individual identifier of each of the mobile devices with a user of the vehicle; allocating costs associated with the tracked events to each the mobile devices; and generating a report of the tracked events and allocated costs associated with the individual identifiers of the mobile devices.

In an embodiment, an in-vehicle head unit is disclosed. The in-vehicle head unit may comprise one or more of the following: a processor; a short-range radio transceiver operable to connect to a plurality of mobile devices; a non-transitory memory; and an application stored in the non-transitory memory that, when executed by the processor, receives a plurality of events from sensors in the vehicle, stores the events in the non-transitory memory, and associates identifiers of the mobile devices with the events received while the mobile devices are connected, wherein the associated identifiers of the mobile devices and the events are transmitted to a network server; whereby one of the head unit or the network server is enabled to generate a usage report based on the tracked events associated with the mobile devices.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for communicating information between an in-vehicle head unit and one or more mobile devices. Mobile devices may be connected to a computer system (or head unit) in a vehicle, for example, by Bluetooth, for the purpose of communicating information from one or more mobile device to the vehicle or vice versa. In an embodiment, the head unit may be used for connecting to and providing in-vehicle wireless communication services which may comprise one or more of voice communication, data communication, Internet browsing, short message service (SMS) messaging or text messaging, email, and other communication services. In some cases, the connection may allow for the mobile device to communicate with a speaker system in the vehicle and/or transfer data (such as music files), information, or preferences of the user of the mobile device (such as seat and mirror positions).

Additionally, the head unit may monitor the status of the vehicle by receiving inputs from sensors via an in-vehicle communications bus. In other words, the vehicle may be equipped with sensors for providing indications of events or processes that occur within the vehicle, which may for example include one or more of the following: miles travelled, gas used, speed, tire wear, oil use, brake use, acceleration, deceleration, lateral movement of shocks, motion detection, engine fail, and impact detection. The sensors may communicate with the computer system (or head unit) of the vehicle, wherein events may be received and stored in a non-transitory memory of the head unit, for example. In some embodiments, the in-vehicle communication bus may comprise a CAN (Car Area Network) bus, wherein the CAN bus may communicate the information received from the sensors to the head unit.

In an embodiment, the indications from the sensors may be converted to the events and/or processes listed above, wherein the sensors may comprise dumb sensors which provide an analog of one or more sensed parameter, wherein the parameter(s) may be summed across one or more time intervals to accumulated information such as miles driven, gallons of gas consumed, etc. For example, a sensor may provide a voltage, wherein the voltage may relate to a speed and may be converted to speed units (such as miles per hour) by multiplying by a conversion constant and/or by integrating over a time interval. In another embodiment, the sensors may comprise smart sensors operable to provide one or more unitized quantities, wherein the quantities may also be summed and/or integrated across one or more time intervals.

Utilizing the information from the events, processes, and/or conditions provided by the sensors in the vehicle (and received by the computer system of the vehicle) and the capability of connection between the computer system (or head unit) of the vehicle and one or more mobile device, the computer system of the vehicle may be operable to associate the identity of a connected mobile device with the information provided by the sensors while the mobile device is connected. This may be useful for tracking or monitoring vehicle usage and associating the usage with a particular driver or drivers, for example, which may be desired for a vehicle with multiple drivers, such as a business vehicle or a family vehicle. Another exemplary use of the system may be in a carpool situation wherein more than one mobile device may connect with the vehicle, and the computer system in the vehicle may track the connection or disconnection of the mobile devices (for example, when a passenger is picked up or dropped off). The head unit (computer system) may associate the identity of the mobile device with the information sensed while the mobile devices are connected with the head unit of the vehicle. The information may be analyzed to determine a cost associated with the use of the vehicle, and this cost may be divided between the more than one mobile device (and therefore one or more user) based on the events that occur while the mobile devices are connected with the vehicle. Additionally, driving habits may be analyzed and reported based on the tracked events, wherein speed, acceleration, and/or braking, for example, may be considered. This information may be analyzed and/or reported by the head unit in the vehicle, or it may be communicated to a network server, wherein the network server may process (and analyze) the information and compile a report of the cost allocations. The head unit in the vehicle may communicate with the network server via the connection with the mobile device and/or via a cellular transceiver within the vehicle.

Figure 1:
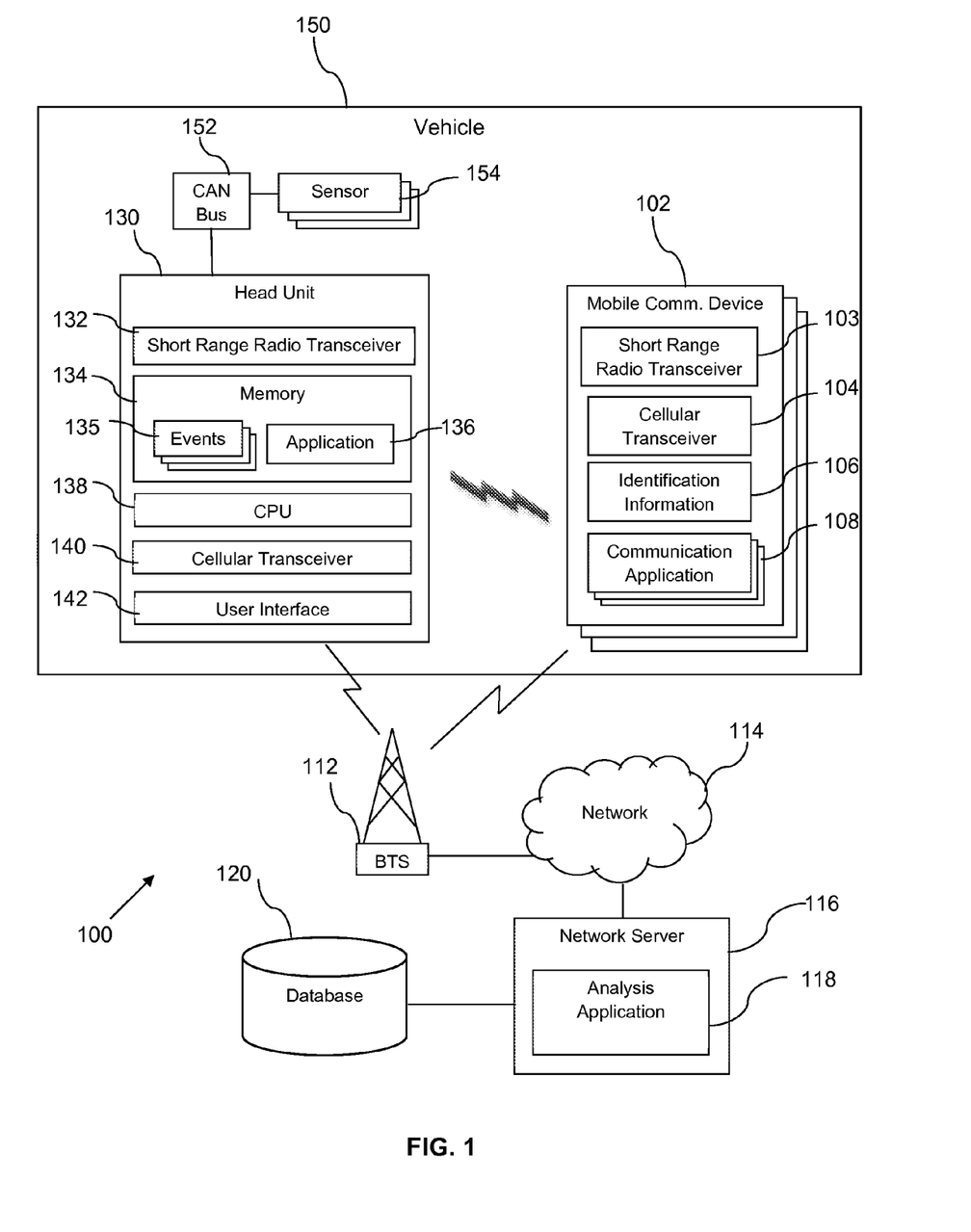
FIG. 1 is an illustration of a communication system according to an embodiment of the disclosure.

Turning now to FIG. 1, a communication system 100 is described. In an embodiment, the communication system 100 comprises one or more mobile communication devices 102. The mobile communication device 102 may comprise a short range radio transceiver 103, a cellular transceiver 104, identification information 106, and a plurality of communication applications 108. The mobile communication device 102 may be configured to use the cellular transceiver 104 to establish a wireless communication link with a base transceiver station (BTS) 112, and the base transceiver station 112 provides communications connectivity of the mobile communication device 102 to a network 114. The network 114 may comprise any combination of private and public networks.

It is understood that the communication system 100 may comprise any number of mobile communication devices 102 and any number of base transceiver stations 112. The collectivity of base transceiver stations 112 may be said to comprise a radio access network, in that these base transceiver stations 112 may provide radio communication links to the mobile communication devices 102 to provide access to the network 114. The radio access network may be abstracted in different ways and may comprise, in addition to the base transceiver stations 112, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102. As shown in FIG. 1, the radio access network may comprise a network server 116 and a database 120 in communication with the network server 116.

The cellular transceiver 104 of the mobile communication device 102 may communicate with the base transceiver station 112 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The mobile communication device 102 may be any of a mobile phone, a personal digital assistant (PDA), a media player, a wireless enabled computer, or other mobile communication device. In an embodiment, the mobile communication device 102 may have other components (not shown) such as a near field communication (NFC) radio transceiver, a wireless local area network (WLAN) radio transceiver, or other components.

The communication applications 108 of the mobile communication device 102 may comprise a voice communication application, a data communication application, a web browser application, an email application, a short message system (SMS) or texting application, a multimedia message system (MMS) application, and other communication applications. The communication applications 108 may be standard communication applications that are delivered by an original equipment manufacturer (OEM) who assembles the mobile communication device 102. The communication applications 108 may be stored as firmware or software in a memory area of the mobile communication device 102.

The communication system 100 of FIG. 1 may also comprise a vehicle 150, wherein the vehicle 150 may be any of an automobile or car, a sports utility vehicle (SUV), a pick-up truck, a mini-van, a van, a truck, a delivery truck, a tractor of a tractor-trailer or "18-wheeler" combination, or other motorized vehicle. The vehicle 150 may comprise a head unit 130 installed that provides a centralized electronic communication capability. The head unit 130 (also known as an in-vehicle computer system and/or a telematics unit) may be operable to communicate with the one or more mobile communication devices 102 using a short range radio transceiver 132 of the head unit 130 and a short range radio transceiver 103 of the mobile communication device 102. The head unit 130 may communicate with the mobile communication device 102 using any of a variety of wireless communication protocols, for example a WiFi radio transceiver, a Bluetooth® radio transceiver, a ZigBee® radio transceiver, a near-field-communication (NFC) radio transceiver, and/or other radio transceivers.

As shown in FIG. 1, the one or more mobile communication devices 102 may be located within the vehicle 150 when in communication with the head unit 130. The head unit 130 may also comprise a non-transitory memory 134, a processor 138, an optional cellular transceiver 140, and an optional user interface 142, wherein the optional cellular transceiver 140 may provide communication with the base transceiver station 112. In an embodiment, the cellular transceiver 140 may be located within the head unit 130, while in other embodiments, the cellular transceiver 140 may be located elsewhere within the vehicle 150, in communication with the head unit 130.

The non-transitory memory 134 of the head unit 130 may comprise an application 136 that, when executed by the processor 138 may receive information and/or a plurality of events 135 from sensors 154 within the vehicle 150 and store the information and/or events 135 in the memory 134. The sensors 154 may provide indications of one or more of the following: miles travelled, gas used, speed, tire wear, oil use, brake use, acceleration, deceleration, lateral movement of shocks, motion detection, engine fail, and impact detection. In some embodiments, the sensors 154 may be in communication with a CAN bus 152, wherein the CAN bus 152 may communicate the information received from the sensors 154 to the head unit 130.

The identification information 106 of the mobile communication device 102 may be communicated to the head unit 130, wherein the application 136 may receive the identification information 106 of the mobile communication device 102 and may associate the identification information 106 with the events 135 received by the application 136 while the head unit 130 is connected to the mobile communication device 102. In other words, the application 136 may monitor the time when the mobile communication device 102 connects with (and/or disconnects from) the head unit 130 as well as the time associated with the stored events 135 and then associate the identification information 106 of the mobile communication device 102 with the events 135 that occur during the time that the mobile communication device 102 is in communication with the head unit 130.

In an embodiment, a plurality of mobile communication devices 102 with separate identification information 106 may be located within the vehicle 150 and connected to the head unit 130, wherein the application 136 may track the times when the plurality of mobile communication devices 102 connect to the head unit 130, wherein the plurality of mobile communication devices 102 may connect and/or disconnect at similar or different times. The identification information 106 of the mobile communication device 102 may be related to the identity of an owner or user of the mobile communication device 102 and may indicate the presence of the owner/user of the mobile communication device 102 within the vehicle. In some embodiments, the location of the vehicle when a mobile communication device 102 connects or disconnects may be tracked by the head unit 130, wherein the location may be included in the events 135 stored in the memory 134 of the head unit 130. In some embodiments, the head unit 130 may comprise a global positioning system (GPS) or other locating application operable to monitor the location of the vehicle, while in other embodiments, the head unit may receive location information from a global positioning system or other locating application within the mobile communication device 102.

In some embodiments, the user of the mobile communication device 102 may be a driver of the vehicle, and a plurality of mobile communication devices 102 may indicate a plurality of drivers of the vehicle 150, wherein the plurality of mobile communication devices 102 may be in communication with the head unit 130 at different times. For example, a first mobile communication device 102 may connect to the head unit 130, the time of connection may be tracked by the application 136, and events 135 may be received by the application 136 and associated with the identification information 106 of the first mobile communication device 102. Then the first mobile communication device 102 may disconnect from the head unit 130 and the time of disconnection may be tracked by the application 136. A second mobile communication device 102 may then connect to the head unit 130, the time of connection may be tracked by the application 136, and events 135 may be received by the application 136 and associated with the identification information 106 of the second mobile communication device 102. Then the second mobile communication device 102 may disconnect from the head unit 130 and the time of disconnection may be tracked by the application 136. This process may be repeated wherein the plurality of mobile communication devices 102 may indicate a plurality of drivers of the vehicle 150. The process described above may, for example, be used for a business owned vehicle with multiple drivers, and/or a family vehicle with multiple drivers.

In other embodiments, the user of the mobile communication device 102 may be a driver or a passenger of the vehicle, and a plurality of mobile communication devices 102 may indicate a driver and one or more passengers of the vehicle 150, wherein the plurality of mobile communication devices 102 may be in communication with the head unit 130 at the same time or within the same time frame. For example, a first mobile communication device 102 may connect to the head unit 130, the time of connection may be tracked by the application 136, and events 135 may be received by the application 136 and associated with the identification information 106 of the first mobile communication device 102. Then (while the first mobile communication device 102 is still connected to the head unit 130) a second mobile communication device 102 may connect to the head unit 130, the time of connection may be tracked by the application 136, and events 135 may be received by the application 136 and associated with the identification information 106 of the second mobile communication device 102. This process may be repeated wherein the first mobile communication device 102 may correspond to a driver of the vehicle 150 and a plurality of subsequently connected mobile communication devices 102 (such as the second mobile communication device 102) may correspond to passengers of the vehicle 150.

In some embodiments, the application 136 of the head unit 130 may analyze the events 135 and the identification information 106 of the mobile communication device 102. In other embodiments, the head unit 130 may communicate the information stored in the memory 134 via the base transceiver station 112 to the network 114, which may then communicate with the network server 116. The network server 116 may comprise an analysis application 118 operable to analyze information received from the head unit 130 of one or more vehicles 150. In some embodiments, the network server 116 may optionally store information in a database 120. The analysis application 118 may be operable to create reports of the information received from the head unit 130, wherein the reports may include a cost analysis related to the use of the vehicle 150. In an embodiment, costs associated with the tracked events 135 may include fuel usage, wear and tear on the vehicle, oil usage, depreciation of the vehicle, among other things.

In some embodiments, the cost may be distributed or allocated between different drivers of the vehicle, and/or the cost may be distributed or allocated between a plurality of passengers and/or drivers of the vehicle. The report may reflect vehicle use for a determined time frame (such as a day, week, month, or year for example) and may, for example, distribute a cost of using the vehicle based on the events received by the head unit memory 134, wherein the events 135 may be associated with one or more mobile communication devices 102 connected to the head unit 130 when the events 135 occur. In some embodiments, the cost of use of the vehicle 150 may be determined from events 135 such as gas used, miles travelled, and/or speed, while other embodiments may include other events 135 in the calculations of cost associated with use of the vehicle 150. The report (or a portion of the report) generated by either the head unit 130 or the network server 116 may be communicated to a user (possibly an owner of the vehicle, multiple drivers of the vehicle, and/or multiple passengers of the vehicle) via the user interface 142 of the head unit 130, the mobile communication device(s) 102, and/or an external website which may be accessed by any device with internet access.

In some embodiments, the head unit 130 may sync (i.e., communicate or transfer information) with the network server 116 automatically or manually, wherein the user interface 142 may be used to manually sync with the network server 116. If the head unit 130 syncs automatically with the network server 116, it may be configured to sync: every time the vehicle 150 is turned off; at a specific time interval such as daily, weekly, and/or monthly; and/or at a specific location (which may be monitored by a GPS system or other location system).

In an exemplary embodiment, the communication system 100 may be used in a situation wherein multiple users (drivers and/or passengers) may use the vehicle at the same time or in the same time frame (such as in a carpool). In this example, a driver may connect a first mobile communication device 102 to the head unit 130 of the vehicle 150, wherein, in some embodiments, the head unit 130 may detect the presence of the mobile communication device 102 and a user may choose to pair (or manually connect) the mobile communication device 102 to the head unit 130 (for example by using the user interface 142). The driver may in some embodiments associate personal information (such as name, email address, etc.) with the identification information 106 of the connected first mobile communication device 102 via the user interface 142, and the driver may also choose to designate the first mobile communication device 102 as the "driver" (or a similar designation, such as the name of the user), possibly by using the user interface 142.

Then, a passenger may enter the vehicle with a second mobile communication device 102, wherein the second mobile communication device 102 may be detected by (and optionally connect to) the head unit 130 of the vehicle 150. The driver and/or passenger may in some embodiments associate personal information (such as name, email address, etc.) with the connected second mobile communication device 102 via the user interface 142 and may also choose to designate the second mobile communication device 102 as a "passenger" (or a similar designation, such as the name of the user), possibly by using the user interface 142. This procedure may be repeated for multiple passengers who may enter the vehicle 150. Similarly, the mobile communication devices 102 may disconnect from the head unit 130 when a passenger and/or driver exits the vehicle 150. The head unit 130 may track the time and possibly the location (via a global positioning system application for example) of the connection and/or disconnection of each mobile communication device 102, wherein the time of connection/disconnection and identification information 106 of the mobile communication device(s) 102 may be tracked and possibly stored in the memory 134 of the head unit 130. This information may be associated with events 135 received by the application 136 in the memory 134, and possibly transmitted via a cellular transceiver 140 to a network server 116.

The analysis application 118 of the network server 116 may analyze the information received from the head unit 130 and generate a report that may reflect an allocated cost of using the vehicle based on the events that occur while each mobile communication device 102 is connected to the head unit 130. In some embodiments, the cost may be allocated based on miles travelled (or gas used) while the mobile communication device 102 is connected to the head unit 130. However, in other embodiments more complex calculations may be used to allocate the cost of vehicle use, which may take into consideration other factors or events, wherein the calculations may be determined by a user of the system. In an exemplary embodiment, if multiple passengers are being picked up by a driver (such as for a work related carpool) it may be desired to not charge one passenger who may be in the vehicle longer (because they are picked up first and/or dropped off last) more than another passenger but rather equally distribute the cost among the passengers. In another example, one passenger may cause a deviation from a previously monitored route, wherein the deviation may be separately charged to the deviating person. In other words, the change in route measured in miles driven (or gas used) caused by the deviation may be individually assessed and charged to the passenger associated with the deviation. In an embodiment, the communication system 100 (or head unit 130) may automatically detect the deviation in route or time and may also be operable to associate the deviation with a mobile communication device 102 that may connect to the head unit 130 before or after the deviation occurs. For example, the communication system 100 or head unit 130 may maintain a driving history and detect a deviation with reference to a history of traveling a specific route on customary days (a work commute Monday through Friday, for example). The communication system 100 or head unit 130 may determine an incremental difference or "delta" with reference to the customary route and allocate the costs of that increment to a particular individual. Additionally, a user may input deviation information to the communication system 100 via a user interface 142.

In another exemplary embodiment, the communication system 100 may comprise a vehicle 150 that may be shared among multiple drivers (for example, a business owned vehicle and/or a family vehicle). In this example, a first driver may use the vehicle and may connect a first mobile communication device 102 to the head unit 130 of the vehicle 150, wherein, in some embodiments, the head unit 130 may detect the presence of the mobile communication device 102 and a user may choose to pair (or manually connect) the mobile communication device 102 to the head unit 130 (for example by using the user interface 142). The first driver may, in some embodiments, associate personal information (such as name, email address, etc.) with the identification information 106 of the connected first mobile communication device 102 via the user interface 142, and the first driver may also choose to designate the first mobile communication device 102 as "first driver" (or a similar designation, such as the name of the first driver), possibly by using the user interface 142.

Then, a second driver may use the vehicle and may connect a second mobile communication device 102, wherein the second mobile communication device 102 may be detected by, and/or connect to, the head unit 130 of the vehicle 150. The second driver may in some embodiments associate personal information (such as name, email address, etc.) with the identification information 106 of the connected second mobile communication device 102 via the user interface 142 and may also choose to designate the second mobile communication device 102 as a "second driver" (or a similar designation, such as the name of the second driver) possibly by using the user interface 142.

This procedure may be repeated for multiple drivers who may use the vehicle 150, wherein the mobile communication devices 102 may disconnect from the head unit 130 when a driver exits the vehicle 150. The head unit 130 may track the time and possibly the location (via a global positioning system application for example) of the connection and/or disconnection of each mobile communication device 102, wherein the time of connection/disconnection and identification information 106 of the mobile communication device(s) 102 may be stored in the memory 134 of the head unit 130. This information may be associated with events 135 received by the application 136 in the memory 134, and possibly transmitted via a cellular transceiver 140 to a network server 116. The analysis application 118 of the network server 116 may analyze the information received from the head unit 130 and generate a report that may reflect an allocated cost of using the vehicle based on the events that occur while each mobile communication device 102 is connected to the head unit 130.

In some embodiments, the information obtained from the events 135 may be used to monitor driving habits (such as speed, acceleration, braking, and/or miles per gallon), wherein the results may be considered when allocating a cost of the use of the vehicle 150, and in some embodiments, may be used by an owner of the vehicle to assess how the vehicle is driven/used (by the owner and/or by others). For example, a parent may wish to monitor the driving habits of a child or a business may wish to monitor the driving habits of employees (when they are driving a business owned vehicle). In some embodiments, the communication system 100 may be used to monitor who is in (or using) a vehicle 150 and/or how many people are in a vehicle, wherein the head unit may be operable to detect any mobile communication device 102 that enters the vehicle 150. In some embodiments, the communication system 100 may be configured such that the vehicle 150 will not run without at least one mobile communication device 102 paired with (or connected to) the head unit 130, thereby restricting a user from using the vehicle 150 without being associated with the events 135 received by the head unit 130.

Figure 2:
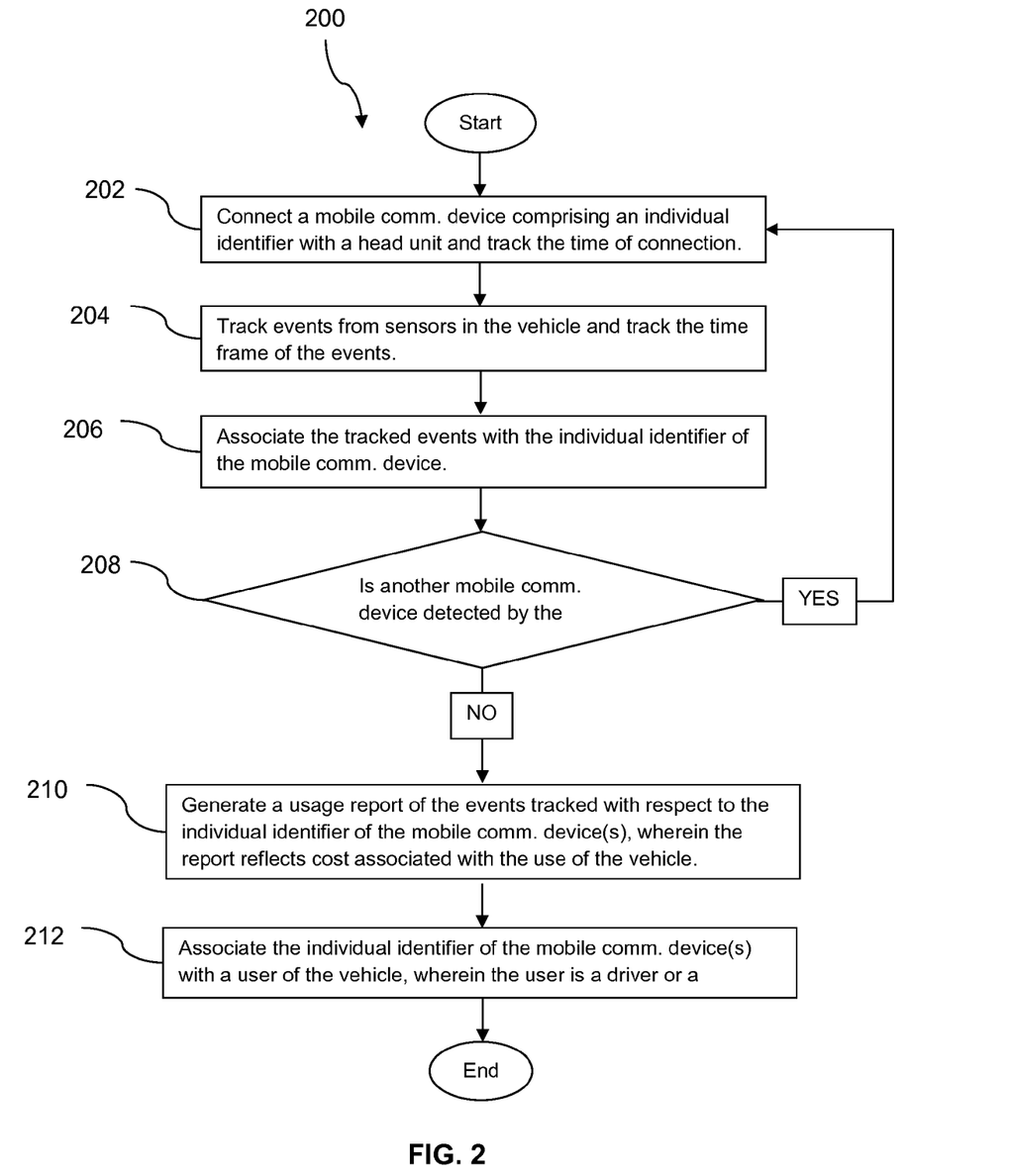
FIG. 2 is a flow chart illustrating a method according to an embodiment of the disclosure.

Turning now to FIG. 2, a method 200 is described. At block 202, a mobile communication device may connect with a head unit of a vehicle, wherein the mobile communication device comprises an individual identifier, and wherein the time of connection is tracked. At block 204, events may be tracked, wherein sensors in the vehicle may provide indications of the tracked events, and the time frame of the events may be tracked as well. The tracked events may, for example, include one or more of the following: miles travelled, gas used, speed, tire wear, oil use, brake use, acceleration, deceleration, lateral movement of shocks, motion detection, engine fail, and impact detection. Additionally, the events may be tracked independently such that a connection between the head unit and a mobile communication device is not required for the tracking to occur. In other words, the tracking of the events may not be affected by the connection between the head unit and a mobile communication device or the number of mobile communication devices connected to the head unit.

At block 206, the events may be associated with the mobile communication device(s). In an embodiment, the time of connection of the mobile communication device to the head unit and the time frame of the tracked events may be compared, wherein the individual identifier of the mobile communication device may be associated with the tracked events that occur in a similar (or the same) time frame of the connection between the head unit and the mobile communication device. In other words, information regarding the presence of one or more mobile communication devices and the events may be gathered separately and then associated by comparing time frames. In an alternative embodiment, the time frame of the connection for the mobile communication device may not need to be tracked and/or monitored, wherein the mobile communication device(s) may be associated (via individual identifiers) with each stored event as it is received and/or stored by the memory of the head unit. In other words, as the events are tracked/received and stored in the memory of the head unit, the identity of the one or more mobile communication devices (i.e. an individual identifier) that are connected to the head unit when the events are stored may be associated with the events (and stored in the memory as well).

At block 208 another mobile communication device may be detected by the head unit, wherein this detection may occur parallel to the connection of the first mobile communication device (in block 202) or after the connection of the first mobile communication device. If more than one mobile communication device is detected by the head unit, the steps of blocks 202 and 206 may be repeated for each (subsequently connected) mobile communication device. For example, a first mobile communication device may connect to the head unit, wherein the time of connection with the head unit is tracked, and then a second mobile communication device may connect to the head unit, wherein the time of connection with the head unit is tracked. If the second mobile communication device connects with the head unit while the first mobile communication device is connected, the first mobile communication device may indicate a driver of the vehicle and the second mobile communication device may indicate a passenger of the vehicle. If the second mobile communication device connects with the head unit after the first mobile communication device disconnects from the head unit, the first mobile communication device may indicate a first driver of the vehicle and the second mobile communication device may indicate a second driver of the vehicle.

At block 210, a usage report may be generated, wherein the report may comprise the tracked events (and/or the analysis of the tracked events) associated with the individual identifier(s) of the one or more mobile communication devices. In an embodiment, the usage report may reflect a cost associated with the use of the vehicle (which may be calculated from analysis of the tracked events). In an embodiment, wherein more than one mobile communication device connects to the head unit, the cost may be allocated among the plurality of mobile communication devices based on the tracked events associated with the individual identifier of each mobile communication device (i.e., events that occur in the time frame of connection with the head unit). At block 212, the individual identifier(s) of the one or more mobile communication devices may be associated with a user of the vehicle, wherein the user may be a driver or a passenger of the vehicle. In an embodiment, the usage report may additionally comprise the identification of the user(s) of the vehicle.

Figure 3:
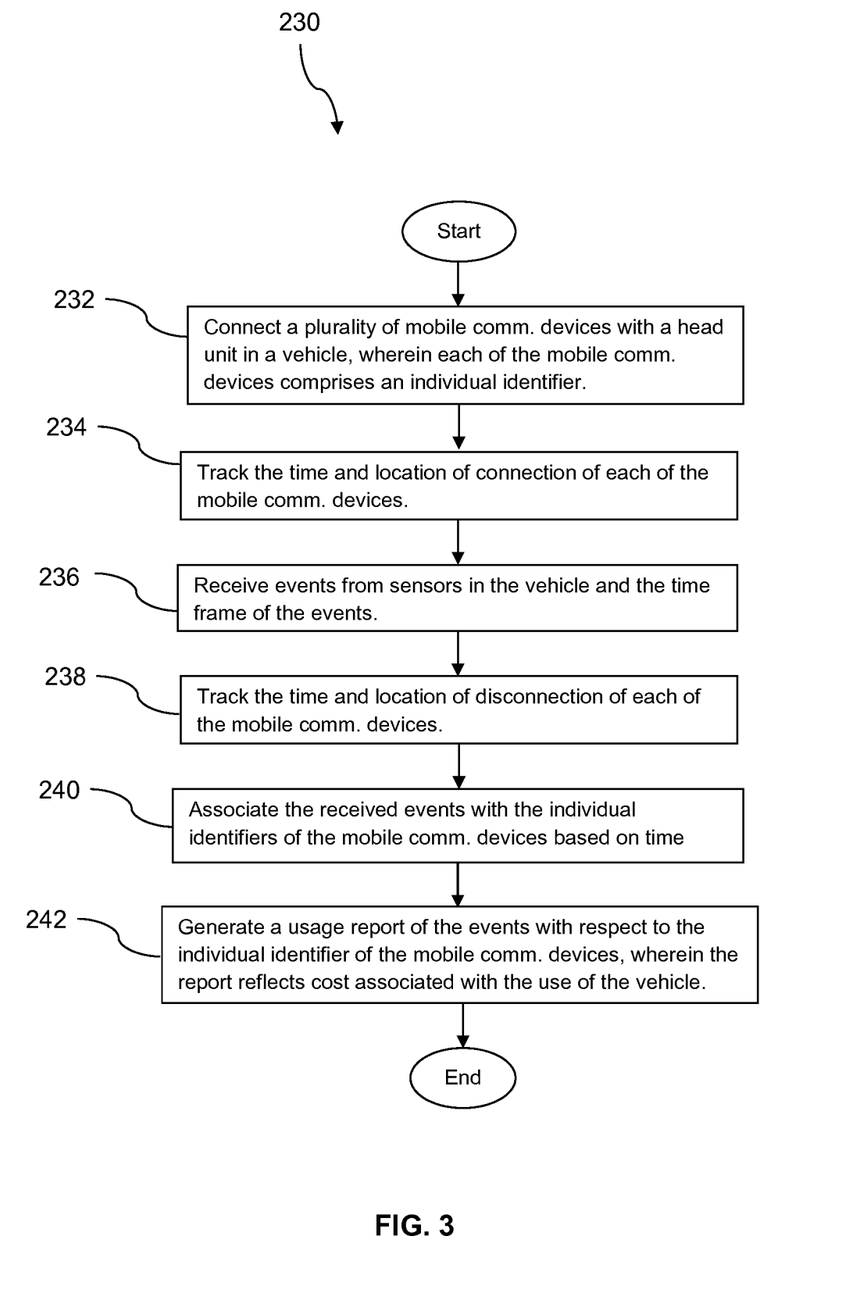
FIG. 3 is a flow chart illustrating another method according to an embodiment of the disclosure.

Turning now to FIG. 3, a method 230 is described. At block 232, a plurality of mobile communication devices may connect with a head unit in a vehicle, wherein each of the mobile communication devices comprises an individual identifier. In an embodiment, the plurality of mobile communication devices may connect with the head unit during different time frames, wherein only one mobile communication device is connected at a time. In this embodiment, the plurality of mobile communication devices may indicate a plurality of drivers of the vehicle. In another embodiment, the plurality of mobile communication devices may connect with the head unit within the same time frame, wherein more than one mobile communication device may connect to the head unit at a time. In this embodiment, the plurality of mobile communication devices may indicate a driver and one or more passengers of the vehicle.

At block 234, the time (and possibly location) of the connection of each of the mobile communication devices with the head unit may be tracked, wherein the time of connection may establish a beginning of the time frame for each of the mobile communication devices. At block 236, events may be received by the head unit, wherein sensors in the vehicle may provide indications of the received events, and the time frame of the events may be received and/or tracked by the head unit as well. The events may, for example, provide indications of one or more of the following: miles travelled, gas used, speed, tire wear, oil use, brake use, acceleration, deceleration, lateral movement of shocks, motion detection, engine fail, and impact detection. Additionally, the events may be received by the head unit independently such that a connection between the head unit and a mobile communication device is not required. In other words, the tracking and/or receiving of the events may not be affected by the connection between the head unit and a mobile communication device or the number of mobile communication devices connected to the head unit. At block 238, the time (and possibly location) of the disconnection of each of the mobile communication devices with the head unit may be tracked, wherein the time of disconnection may establish an end for the time frame for each of the mobile communication devices.

At block 240, the time frame of connection of the mobile communication devices to the head unit and the time frame of the received events may be compared, wherein the individual identifiers of the mobile communication devices may be associated with the received events that occur in a similar (or the same) time frame. At block 242, a usage report may be generated, wherein the report may comprise the tracked events (and/or the analysis of the tracked events) associated with the individual identifier(s) of the one or more mobile communication devices. In an embodiment, the usage report may reflect a cost associated with the use of the vehicle, wherein the cost may be allocated between the mobile communication devices based on the tracked events associated with the individual identifier of each mobile communication device (i.e., events that occur in the time frame of connection with the head unit).

Figure 4:
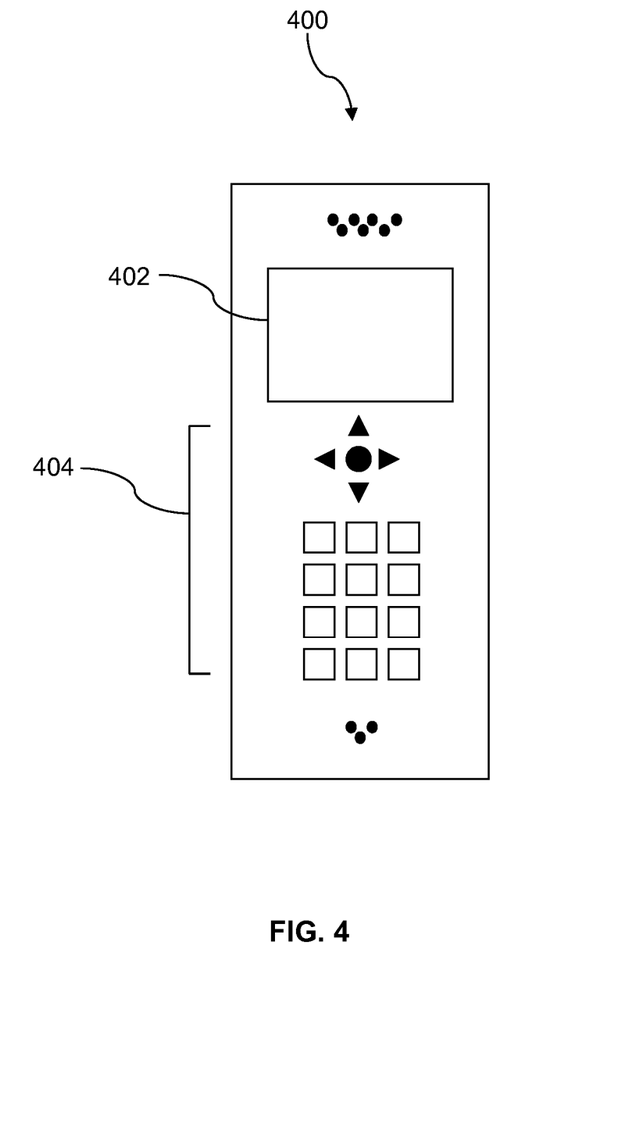
FIG. 4 is an illustration of a mobile communication device according to an embodiment of the disclosure.

FIG. 4 shows a wireless communications system including the mobile device 400. FIG. 4 depicts the mobile device 400 that is operable for implementing aspects of the present disclosure. However, the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example, from a wireless base station, a wireless access point, or a peer mobile device 400. The mobile device 400 may execute a web browser application that enables the display 402 to show a web page. The web page may be obtained via wireless communications with a base transceiver station, a wireless network access node, a peer mobile device 400 or any other wireless communication network or system.

Figure 5:
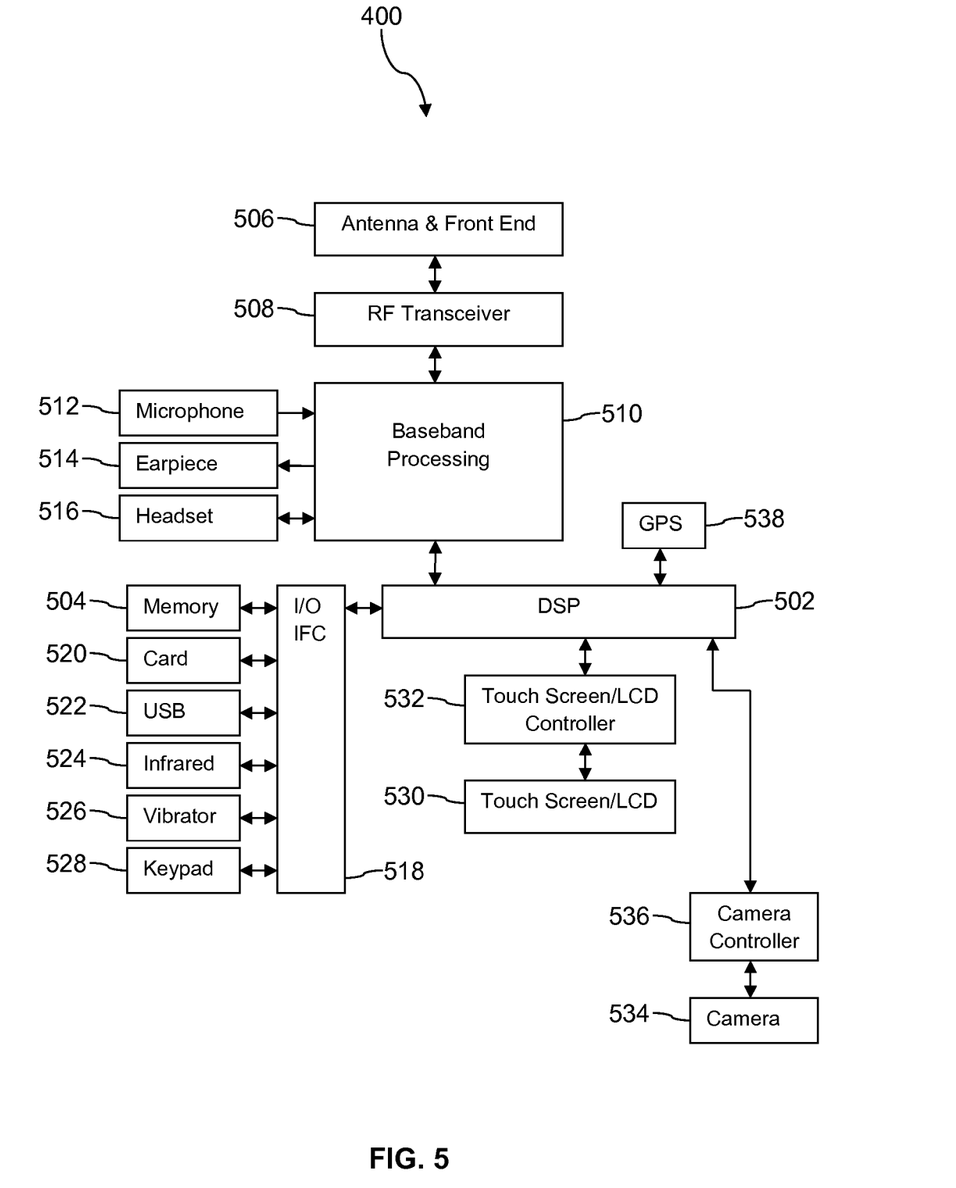
FIG. 5 is a block diagram of a mobile communication device according to an embodiment of the disclosure.

FIG. 5 shows a block diagram of the mobile device 400. The mobile device 400 may be an example of the mobile communication device 102 depicted in FIG. 1 and/or the head unit 130 depicted in FIG. 1. While a variety of known components of handsets are depicted, in an embodiment, a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with the embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
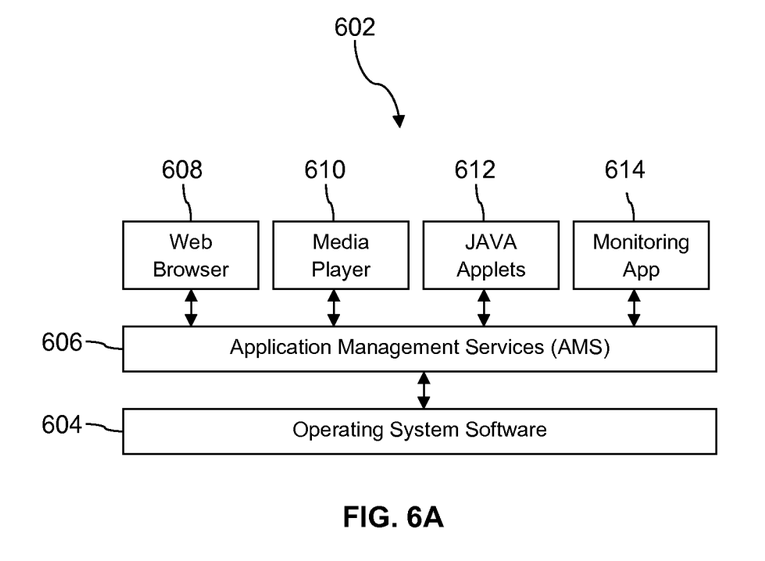
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, JAVA applets 612, and a monitoring application 614. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality. The monitoring application 614 may be substantially similar to the application 136 as described above in FIG. 1.

Figure 6B:
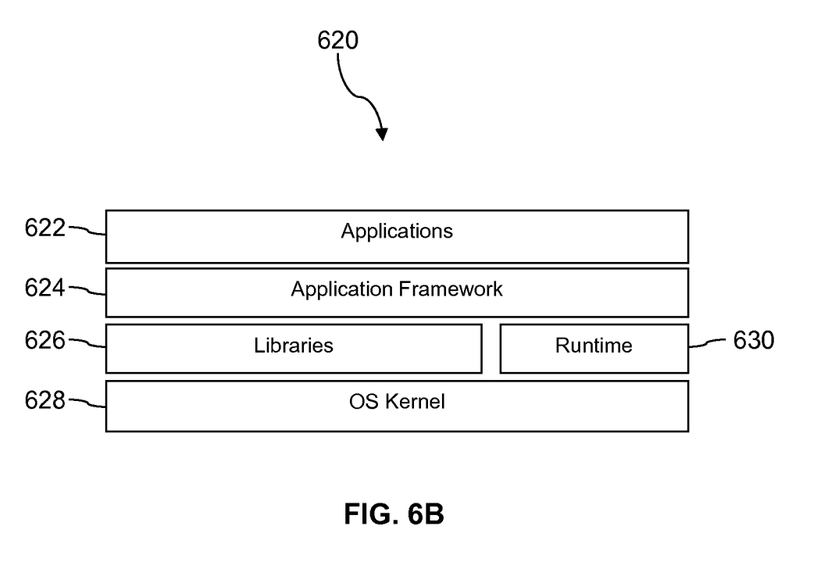
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
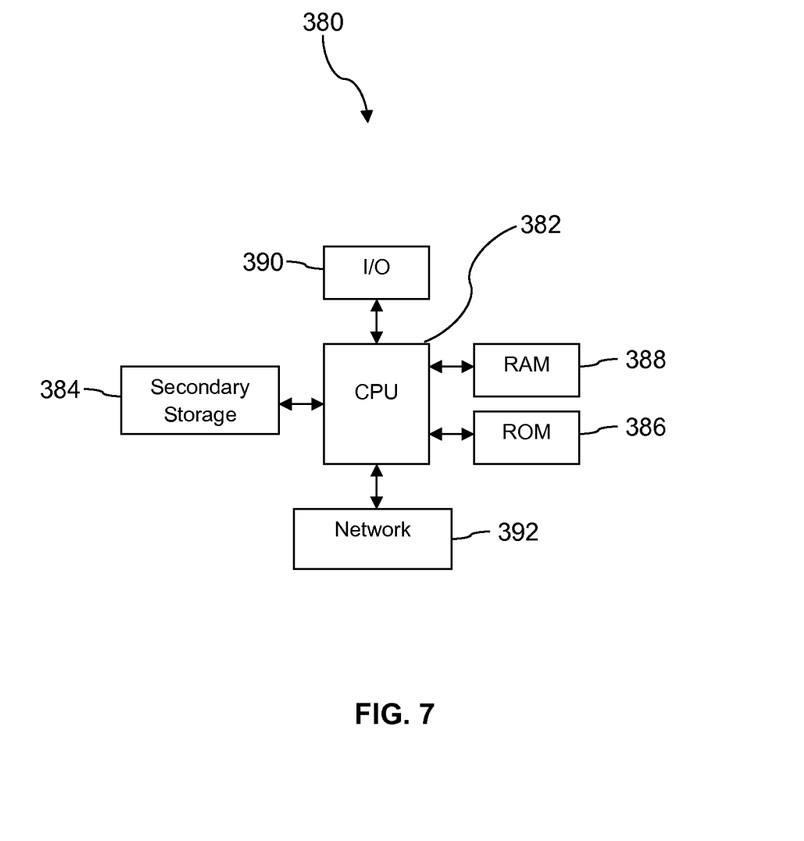
FIG. 7 illustrates an exemplary computer system suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, a magnetic disk, an optical disk, a solid state memory chip, for example an analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

We claim:

1. A method for dynamically adapting to events during operations of a vehicle, comprising:
- connecting, by an in-vehicle head unit executing at least one processor, a plurality of mobile devices based on communicatively coupling with the in-vehicle head unit of the vehicle, each mobile device of the plurality of mobile devices comprising an individual identifier;
- detecting, by the in-vehicle head unit, the individual identifier of each of the plurality of mobile devices;
- receiving, by the in-vehicle head unit, a plurality of events from at least one of a plurality of sensors communicatively coupled with the vehicle, the plurality of events including any of vehicle location, miles travelled, gas used, speed, tire wear, oil use, brake use, acceleration, deceleration, lateral movement of shocks, motion detection, engine fail, and impact detection information;
- monitoring, by the in-vehicle head unit, a time frame for each individual identifier of each of the plurality of mobile devices, wherein the time frame is based on the amount of time the individual identifier is detected;
- responsive to receiving the plurality of events, associating, by the in-vehicle head unit, at least one of the individual identifiers of the plurality of mobile devices with at least one of the plurality of events during the monitored time frame corresponding to the at least one of the individual identifiers, wherein the at least one of the plurality of events associated with the at least one of the individual identifiers is received while the at least one of the individual identifiers is detected; and
- transmitting, by the in-vehicle head unit, the associated individual identifiers of the plurality of mobile devices and the plurality of events to a network server via any of a cellular transceiver of the vehicle and one of the plurality of mobile devices detected by the in-vehicle head unit, wherein the associated individual identifiers and the plurality of events trigger at least one of the in-vehicle head unit or the network server to generate a usage report based on the plurality of events associated with the plurality of mobile devices.

2. The method of claim 1, further comprising:
- associating, by the in-vehicle head unit, at least one of the individual identifiers of the plurality of mobile devices with a user associated with one of the plurality of mobile devices;
- responsive to the transmitting, allocating, by any of the in-vehicle head unit and the network server, costs associated with the plurality of events to at least one of the plurality of mobile devices; and
- based on the allocating, generating, by any of the in-vehicle head unit and the network server, the usage report from the allocated costs associated with the individual identifiers of the plurality of mobile devices.

3. The method of claim 2 further comprising:
- receiving, on a user interface, the usage report that is generated by any of the in-vehicle head unit and the network server based on the plurality of events and the individual identifiers of the plurality of mobile devices.

4. The method of claim 1, wherein the plurality of mobile devices are associated with users of a carpool system, wherein one mobile device of the plurality of mobile devices corresponds to a driver and another mobile device of the plurality of mobile devices corresponds to a passenger.

5. The method of claim 1, further comprising configuring a user interface that displays the usage report on any of the in-vehicle head unit and at least one of the plurality of mobile devices.

6. A system for dynamically adapting to events during operations of a vehicle, comprising:
- a plurality of sensors communicatively coupled with the vehicle that provide an indication of events; and
- an in-vehicle head unit comprising:
  - at least one processor,
  - a cellular transceiver,
  - a short-range radio transceiver that is configured to communicatively couple with a plurality of mobile devices,
  - a non-transitory memory, and
  - an application stored in the non-transitory memory that, upon execution configures the at least one processor to,
    - receive a plurality of events from at least one of the plurality of sensors communicatively coupled with the vehicle, the plurality of events include any of vehicle location, miles travelled, gas used, speed, tire wear, oil use, brake use, acceleration, deceleration, lateral movement of shocks, motion detection, engine fail, and impact detection information,
    - store the plurality of events in the non-transitory memory, wherein storage of the plurality of events develops a history for at least some of the plurality of events,
    - detect an identifier of each of the plurality of mobile devices, wherein at least one of the plurality of mobile devices is communicatively coupled with the in-vehicle head unit,
    - monitor a time frame for each identifier, wherein the time frame is based on the amount of time the identifier is detected,
    - associate at least one identifier of the plurality of mobile devices with at least one of the plurality of events during the monitored time frame corresponding to the at least one identifier, wherein the at least one of the plurality of events is received while the at least one identifier is detected,
    - transmit the associated identifiers of the plurality of mobile devices and the plurality of events to a network server via any of the cellular transceiver and one of the plurality of mobile devices detected by the in-vehicle head unit, wherein the associated identifiers and the plurality of events trigger at least one of the in-vehicle head unit or the network server to generate a usage report based on the plurality of events associated with the plurality of mobile devices.

7. The system of claim 6, wherein the head unit further configures the at least one processor to correlate, based on the association with at least one of the identifiers, a deviation between: the plurality of events received from the at least one of the plurality of sensors in the vehicle while an identifier is detected and the history for at least some of the plurality of events stored in the non-transitory memory.

8. The system of claim 6, wherein the in-vehicle head unit configures the at least one processor to monitor the time frame by tracking the time of a connection and disconnection of the plurality of mobile devices to the head unit via detection of the corresponding identifier.

9. The system of claim 6, wherein the network server analyzes the associated events and generates the usage report based on the analysis.

10. The system of claim 9, wherein the usage report reflects a cost calculation based on the plurality of events received by the application of the head unit while the plurality of mobile devices are connected to the head unit.

11. The system of claim 10, wherein the usage report is communicated to users via at least one of: a user interface of the head unit, a mobile device, and a website.

12. The system of claim 10, wherein the cost reflected in the usage report is divided among at least some of the individual identifiers of the plurality of mobile devices based on the plurality of events that are received while the plurality of mobile devices are connected with the head unit.

13. The system of claim 12, wherein the plurality of mobile devices are associated with a plurality of drivers of the vehicle.

14. The system of claim 12, wherein the plurality of mobile devices are associated with a driver and at least one passenger of the vehicle.

15. The system of claim 6, wherein the in-vehicle head unit further comprises a user interface that is configurable to display the usage report.

\* \* \* \* \*